United States Patent
Higeshiro et al.

(10) Patent No.: US 8,945,711 B2
(45) Date of Patent: Feb. 3, 2015

(54) WATER-BASED COMPOSITE RESIN COMPOSITION AND AN ARTICLE COMPRISING THE SAME

(75) Inventors: Tomokazu Higeshiro, Osaka (JP); Mitsuru Kitada, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/114,416

(22) PCT Filed: Mar. 9, 2012

(86) PCT No.: PCT/JP2012/056069
§ 371 (c)(1),
(2), (4) Date: Oct. 28, 2013

(87) PCT Pub. No.: WO2012/147418
PCT Pub. Date: Nov. 1, 2012

(65) Prior Publication Data
US 2014/0079944 A1  Mar. 20, 2014

(30) Foreign Application Priority Data

Apr. 28, 2011 (JP) ................................. 2011-101127

(51) Int. Cl.

| | |
|---|---|
| *C08L 63/00* | (2006.01) |
| *C08L 63/04* | (2006.01) |
| *C08L 67/02* | (2006.01) |
| *C08L 67/03* | (2006.01) |
| *C09D 163/00* | (2006.01) |
| *C09D 163/04* | (2006.01) |
| *C09D 167/02* | (2006.01) |
| *C09D 167/03* | (2006.01) |
| *C08K 5/00* | (2006.01) |
| *C08K 5/16* | (2006.01) |
| *C08K 5/17* | (2006.01) |
| *C08K 5/04* | (2006.01) |
| *C08K 5/05* | (2006.01) |
| *C08K 5/092* | (2006.01) |
| *B32B 27/08* | (2006.01) |
| *B32B 27/18* | (2006.01) |
| *B32B 27/26* | (2006.01) |
| *B32B 27/36* | (2006.01) |
| *B32B 27/38* | (2006.01) |

(52) U.S. Cl.
CPC ............ *C09D 167/03* (2013.01); *C09D 167/02* (2013.01); *C08L 67/02* (2013.01); *C09D 163/00* (2013.01); *C08L 63/00* (2013.01); *C09D 163/04* (2013.01)
USPC ........... 428/407; 428/402; 428/403; 428/412; 428/414; 428/480; 528/272; 528/293; 528/295; 528/302; 528/305; 528/308; 525/403; 525/408; 525/437; 525/438; 525/449; 525/398

(58) Field of Classification Search
None
See application file for complete search history.

(56) References Cited

U.S. PATENT DOCUMENTS

| | | | | |
|---|---|---|---|---|
| 4,252,885 | A * | 2/1981 | McGrail et al. | 430/160 |
| 4,340,519 | A * | 7/1982 | Kotera et al. | 523/414 |
| 4,383,055 | A * | 5/1983 | Johannes et al. | 523/221 |
| 4,842,936 | A * | 6/1989 | Kashihara et al. | 428/407 |
| 5,183,835 | A * | 2/1993 | Gross et al. | 523/402 |
| 5,210,154 | A * | 5/1993 | Weidemeier et al. | 525/438 |
| 5,272,187 | A * | 12/1993 | Gross et al. | 523/402 |
| 5,508,373 | A * | 4/1996 | Shah et al. | 528/120 |
| 5,623,003 | A * | 4/1997 | Tanaka | 523/428 |
| 5,708,059 | A * | 1/1998 | Pfeil et al. | 523/423 |
| 7,122,250 | B2 * | 10/2006 | Kinsho et al. | 428/407 |
| 7,196,124 | B2 * | 3/2007 | Parker et al. | 523/457 |
| 7,759,432 | B2 * | 7/2010 | Zhou et al. | 525/438 |
| 7,763,350 | B2 * | 7/2010 | Desai et al. | 428/339 |
| 8,349,945 | B2 * | 1/2013 | Malotky et al. | 524/588 |
| 2003/0125479 | A1 * | 7/2003 | Kinsho et al. | 525/403 |
| 2007/0088117 | A1 | 4/2007 | Zhou et al. | |

FOREIGN PATENT DOCUMENTS

| | | |
|---|---|---|
| JP | S61-37811 A | 2/1986 |
| JP | S61-143427 A | 7/1986 |
| JP | H03-264355 A | 11/1991 |
| JP | H05-295343 A | 11/1993 |
| JP | H06-032872 A | 2/1994 |
| JP | H09-235354 A | 9/1997 |

(Continued)

OTHER PUBLICATIONS

An International Search Report, mailed May 29, 2012, which issued during the prosecution of International Application No. PCT/JP2012/056069, which corresponds to the present application.
An Office Action, mailed Janaury 22, 2013, which issued during the prosecution of Japanese Application No. 2012-531582, which corresponds to the present application.

*Primary Examiner* — Vivian Chen

(74) *Attorney, Agent, or Firm* — McDermott Will & Emery LLP

(57) ABSTRACT

It is an object of the present invention to provide a water-based composite resin composition which has an excellent long-term storage stability and which enables formation of a coating film having an excellent water resistance and solvent resistance. The present invention relates to a water-based composite resin composition and a coating agent; the water-based composite resin composition containing composite resin particles (A) and an aqueous medium (B), the composite resin particles (A) containing polyester resin (a1) particles having a sulfonate group and an epoxy resin (a2) of which some or all parts are encapsulated in the polyester resin (a1) particles, wherein a mass ratio [(a1)/(a2)] of the polyester resin (a1) to the epoxy resin (a2) in the composite resin particles (A) is in the range of 95/5 to 30/70.

8 Claims, No Drawings

(56) References Cited

FOREIGN PATENT DOCUMENTS

| | | | |
|---|---|---|---|
| JP | 2001-011295 A | 1/2001 |
| JP | 2002-275364 A | 9/2002 |
| JP | 2004-107568 A | 4/2004 |
| JP | 2007-107004 A | 4/2007 |

* cited by examiner

WATER-BASED COMPOSITE RESIN COMPOSITION AND AN ARTICLE COMPRISING THE SAME

CROSS REFERENCE TO PRIOR APPLICATIONS

This application is a U.S. National Phase application under 35 U.S.C. §371 of International Application No. PCT/JP2012/056069, filed on Mar. 9, 2012 and claims benefit of priority to Japanese Patent Application No. 2011-101127, filed on Apr. 28, 2011. The International Application was published in Japanese on Nov. 1, 2012 as WO 2012/147418 A1 under PCT Article 21(2). The contents of the above applications are hereby incorporated by reference.

TECHNICAL FIELD

The present invention relates to a water-based composite resin composition containing composite resin particles which contain a polyester resin and an epoxy resin, the water-based composite resin composition being usable in a variety of applications such as a coating agent and an adhesive.

BACKGROUND ART

Coating agents need to enable the surfaces of a variety of substrates to have a good design and to enable highly durable coating films to be formed to preclude degradation of the surfaces of substrates. Especially in recent years, there has been an industrial need for a coating agent which enables formation of a coating film having a water resistance as well as excellent solvent resistance which enables substrates to be prevented from being degraded, for instance, by application of detergents or by use of a variety of marker pens.

A coating agent having such characteristics is employed as a coating agent used for protecting the surfaces of metal substrates which easily cause rust and corrosion due to contact thereof with, for instance, water in many cases. Such a coating agent used for protecting the surfaces of metal substrates needs to have a water resistance and high solvent resistance which enable the surfaces of the metal substrates to be prevented from corroding. In particular, in the iron and steel industry in which the surfaces of coating films formed on the surfaces of metal substrates are frequently washed with, for example, an alkaline detergent, the solvent resistance is an important characteristic in terms of prevention of, for instance, removal and dissolution of the coating film and degradation of the metal substrates due to effects of the detergent.

An example of known coating agents which enable formation of a coating film having a good water resistance and solvent resistance as described above is a coating agent that is an aqueous resin dispersion which contains 99 to 60 parts by mass of a polyester resin having a weight average molecular weight of not less than 6,000 and an acid value of 8 to 80 mgKOH/g and 1 to 40 parts by mass of an epoxy resin exhibiting a solubility of not more than 5 mass % in water at 25° C. and in which the maximum dispersed particle size of the resin components are not more than 1.0 μm (e.g., see Patent Literature 1).

Such a coating agent enables formation of a coating film having a water resistance and solvent resistance that are acceptable to some extent. Coating films formed of such a coating agent, however, have not completely satisfied the quality demand, for example, in the field of the above-mentioned surface treatment of metal.

Resin compositions used for coating agents or other materials are generally transported or stored, for example, under a variety of temperature conditions; the term of transporting or storing the resin compositions may be for a maximum of approximately six months in some cases.

In the case where the above-mentioned coating agent is stored under a relatively high-temperature environment for approximately a month, the coating agent readily undergoes gelation and coagulation. Hence, such a coating agent does not have a sufficient long-term storage stability and thus causes a problem such as defective film formation in a process for forming a coating film in some cases.

CITATION LIST

Patent Literature

PTL 1: Japanese Unexamined Patent Application Publication No. 2004-107568

SUMMARY OF INVENTION

Technical Problem

It is an object of the present invention to provide a water-based composite resin composition which has an excellent long-term storage stability and which enables formation of a coating film having an excellent water resistance and solvent resistance.

Solution to Problem

The inventors have conducted studies to achieve the above-mentioned object and found that the object can be accomplished by a water-based composite resin composition containing composite resin particles (A) and an aqueous medium (B); in the water-based composite resin composition, the composite resin particles (A) contain a polyester resin (a1) having a sulfonate group and an epoxy resin (a2), and the mass ratio [(a1)/(a2)] of the polyester resin (a1) to the epoxy resin (a2) in the composite resin particles (A) is adjusted to be in a specific range.

In particular, an aspect of the present invention provides a water-based composite resin composition containing composite resin particles (A) and an aqueous medium (B), the composite resin particles (A) containing polyester resin (a1) particles having a sulfonate group and an epoxy resin (a2) of which some or all parts are encapsulated in the polyester resin (a1) particles, wherein a mass ratio [(a1)/(a2)] of the polyester resin (a1) to the epoxy resin (a2) in the composite resin particles (A) is in the range of 95/5 to 30/70; another aspect of the present invention provides a coating agent.

Advantageous Effects of Invention

The water-based composite resin composition according to an aspect of the present invention has an excellent storage stability in long-term storage from approximately one to six months and enables formation of a coating film having an excellent water resistance and solvent resistance; hence, the water-based composite resin composition can be, for example, used for coating agents and adhesives.

In particular, the water-based composite resin composition can be used in applications such as anchor coat agents used for a variety of films; coating agents used for the inside or outside of cans; coating materials used for steel plates; anti-rust paints; coating materials used for pre-coated metal; adhesives used for steel plates; adhesives used for resin sheets or films; film coating agents; adhesives used for bonding thermoplastic resin sheets and films, such as vinyl chloride and a polyester resin, to steel plates; surface treatment agents; inks; textile treatment agents; and paper-coating agents.

DESCRIPTION OF EMBODIMENTS

A water-based composite resin composition of the present invention contains composite resin particles (A), an aqueous medium (B), and optionally an additive, the composite resin particles (A) containing polyester resin (a1) particles having a sulfonate group and an epoxy resin (a2) of which some or all parts are encapsulated in the polyester resin (a1) particles, wherein a mass ratio [(a1)/(a2)] of the polyester resin (a1) to the epoxy resin (a2) in the composite resin particles (A) is in the range of 95/5 to 30/70.

In the composite rein particles in which some or all parts of the epoxy resin (a2) are encapsulated in the polyester resin (a1) particles having a sulfonate group, the mass ratio of the polyester resin (a1) to the epoxy resin (a2) is adjusted to be in the above-mentioned specific range, which is important in the present invention to enable both excellent storage stability and the excellent physical properties of a coating film, such as water resistance and solvent resistance.

The polyester resin (a1) and the epoxy resin (a2) are not separately dispersed in the form of independent resin particles in the aqueous medium (B); the epoxy resin (a2) is dispersed in the aqueous medium (B) via the polyester resin (a1). In particular, some or all parts of the epoxy resin (a2) are encapsulated in the polyester resin (a1) particles, thereby forming the composite resin particles (A).

In the composite resin particles (A), some or all parts of the epoxy resin (a2) are preferably dispersed in the polyester resin (a1) particles in the form of single or multiple particles. Furthermore, in the composite resin particles (A), it is preferred that the epoxy resin (a2) serve as the core and that the polyester resin (a1) serve as the shell.

It is preferred that the composite resin particles (A) dispersed in the aqueous medium (B) substantially do not have a cross-linked structure thereinside.

The term "substantially do not have a cross-linked structure" herein refers to a state in which a cross-linked structure is not formed inside the composite resin particles (A), in particular, between particles of the polyester resin (a1) that serves as the shell, between particles of the epoxy resin (a2) that serves as the core, and between the polyester resin (a1) and the epoxy resin (a2) or slightly formed, for instance, to such an extent that the storage stability of the water-based composite resin composition of the present invention is not impaired. In order to enable both the excellent storage stability and film-forming property of the water-based composite resin composition of the present invention and to form a coating film having an excellent water resistance and solvent resistance, the crosslink density inside the composite resin particles (A) is preferably small as much as possible, and the composite resin particles (A) are more preferably free from a cross-linked structure.

In the present invention, some or all parts of the epoxy resin (a2) are not merely encapsulated in the polyester resin (a1) particles in the composite resin particles (A); the mass ratio of the polyester resin (a1) to the epoxy resin (a2) [(a1)/(a2)] needs to be in a specific range of 95/5 to 30/70.

At the mass ratio greater than 95/5, the water resistance and solvent resistance of a coating film are reduced in some cases.

At the mass ratio less than 30/70, maintaining the good storage stability in the aqueous medium (B) is difficult in some cases.

Hence, in the present invention, the mass ratio [(a1)/(a2)] of the polyester resin (a1) to the epoxy resin (a2) is preferably in the range of 80/20 to 30/70, and more preferably 55/45 to 30/70 in terms of formation of a coating film having an particularly excellent water resistance and solvent resistance.

The composite resin particles (A) have a sulfonate group that serves as a hydrophilic group needed for the dispersion thereof in the aqueous medium (B). The sulfonate group has a structure in which a sulfonic acid group has formed a salt with metal such as lithium, sodium, potassium, magnesium, calcium, copper, or iron. In particular, in the sulfonate group, the sulfonic acid group has been neutralized with a basic compound such as a sodium hydroxide or a lithium hydroxide. The sulfonate group may be formed thorough neutralization with another basic compound such as ammonia, ethylamine, diethylamine, triethylamine, or isopropylamine.

Since the sulfonate group contributes to good water dispersibility, the water-based composite resin composition can have an excellent long-term storage stability. In addition, the sulfonate group contained in the composite resin particles (A) contributes to an increase in the percentage of the mass of the epoxy resin (a2) in the whole of the composite resin particles (A), which enables formation of a coating film having a further excellent water resistance and solvent resistance.

In the case of using composite resin particles which contain a carboxyl group or a carboxylate group in place of the sulfonate group, excellent long-term storage stability and water resistance cannot be developed in the water-based composite resin composition in some cases, and the carboxyl group reacts with the epoxy group of the epoxy resin (a2) to induce, for example, gelation in some cases. In addition, use of a carboxyl group or a carboxylate group makes it difficult to adjust the percentage of the mass of the epoxy resin (a2) in the whole of the composite resin particles (A) to be approximately not less than 40 mass % with the result that a coating film having an excellent water resistance and solvent resistance is not successfully formed in some cases.

Since a sulfonate group is generally more hydrophilic than, for example, a carboxylate group, introduction of the sulfonate group into a resin ordinarily has a possibility of a reduction in the water resistance of a coating film that is to be formed.

In the present invention, however, in spite of using the polyester resin (a1) having a sulfonate group, not less than 5 mass %, preferably not less than 40 mass %, and more preferably not less than 45 mass % of the above-mentioned epoxy resin (a2) content enables a further enhancement in the water resistance without impairing storage stability.

The sulfonate group is preferably present in the polyester resin (a1) that serves as the shell of the composite resin particles (A). The sulfonate group content is preferably in the range of 0.1 mol/kg to 1.0 mol/kg, and especially preferably 0.2 mol/kg to 0.6 mol/kg relative to the total amount of the polyester resin (a1) to enables both excellent long-term storage stability and the excellent water resistance and solvent resistance of a coating film.

The polyester resin (a1) contained in the composite resin particles (A) may be the polyester resin (a1) having a sulfonate group. In particular, for example, aromatic polyester resins and aliphatic polyester resins can be used, and the aromatic polyester resins are preferably used to form a coating film having an excellent water resistance and solvent resistance.

The polyester resin (a1) that is to be used has a weight average molecular weight preferably ranging from 5,000 to 30,000, and more preferably 5,000 to 15,000. Within such a weight average molecular weight, good coating workability and film-forming property with proper viscosity can be developed without impairing excellent water resistance, solvent resistance, and storage stability.

The polyester resin (a1) that is to be used preferably has a glass transition temperature of 30° C. to 100° C. The polyester resin (a1) having such a glass transition temperature enables development of good coating workability and film-forming property with proper viscosity without impairing excellent water resistance, solvent resistance, and storage stability.

The polyester resin (a1) that is to be used may be produced through the reaction of a polyol (a1-1) with a polycarboxylic acid (a1-2).

The sulfonate group of the polyester resin (a1) can be introduced into the polyester resin (a1) by using a sulfonate group-containing compound, such as a sulfonate group-containing polyol or a sulfonate group-containing polycarboxylic acid, as some parts of the polyol (a1-1) or polycarboxylic acid (a1-2).

Examples of the polyol (a1-1) that is to be used include aliphatic polyols such as ethylene glycol, 1,2-propanediol, 1,3-propanediol, 1,4-butanediol, 2-methyl-1,3-propanediol, 1,5-pentanediol, neopentylglycol, 1,6-hexanediol, 3-methyl-1,5-pentanediol, 1,9-nonanediol, 2-ethyl-2-butylpropanediol, diethylene glycol, triethylene glycol, and dipropylene glycol; and polyols having an alicyclic structure, such as 1,4-cyclohexanedimethanol. Other examples of the polyol that is to be used include polyols having three or more hydroxyl groups, such as glycerine, trimethylolethane, trimethylolpropane, and pentaerythritol.

Some or all parts of the polyol (a1-1) that is to be used may be a sulfonate group-containing polyol that is the sulfonate group-containing compound; for instance, a sulfonate group-containing polyol produced through sulfonation of an unsaturated group-containing polyol such as 2-butene-1,4-diol can be used.

Example of the polycarboxylic acid (a1-2) which can react with the polyol (a1-1) include aromatic polycarboxylic acids such as terephthalic acid, isophthalic acid, orthopthalic acid, naphthalenedicarboxylic acid, and biphenyldicarboxylic acid; saturated or unsaturated aliphatic polycarboxylic acids such as oxalic acid, succinic acid, succinic anhydride, adipic acid, azelaic acid, sebacic acid, dodecanoic diacid, hydrogenated dimer acid, fumaric acid, maleic acid, maleic anhydride, itaconic acid, itaconic anhydride, citraconic acid, citraconic anhydride, and dimer acid; and polycarboxylic acids having an alicyclic structure, such as 1,4-cyclohexanedicarboxylic acid, 1,3-cyclohexanedicarboxylic acid, 1,2-cyclohexanedicarboxylic acid, 2,5-norbornenedicarboxylic acid and anhydrides thereof, and tetrahydrophthalic acid and anhydrides thereof. Among these, in terms of development of excellent water resistance and solvent resistance, an aromatic polycarboxylic acid (a1-2-1) is preferably used, and terephthalic acid and isophthalic acid are more preferably used.

Other examples of the polycarboxylic acid (a1-2) include polycarboxylic acids having three or more carboxylic groups, such as trimellitic acid, pyromellitic acid, benzophenonetetracarboxylic acid, trimellitic anhydride, pyromellitic anhydride, benzophenonetetracarboxylic acid anhydride, trimesic acid, ethylene glycol bis(anhydrotrimellitate), glycerol tris (anhydrotrimellitate), and 1,2,3,4-butanetetracarboxylic acid.

Some or all parts of the polycarboxylic acid (a1-2) that is to be used may be a sulfonate group-containing polycarboxylic acid. Examples of the sulfonate group-containing polycarboxylic acid include metals of 4-sulfoisophthalic acid, 5-sulfoisophthalic acid, sulfoterephthalic acid, and 4-sulfonaphthalene-2,7-dicarboxylic acid. In particular, 5-sodium sulfoisophthalic acid and esterification products thereof, such as dimethyl 5-sodiosulfoisophthalate, are preferably employed.

In particular, considering development of excellent water resistance and solvent resistance without impairment of long-term storage stability, 5-sodium sulfoisophthalic acid and esterification products thereof are preferably used; dimethyl 5-sodiosulfoisophthalate is more preferably employed.

The epoxy resin (a2) contained in the composite resin particles (A) is essential for developing the excellent water resistance and solvent resistance of a coating film that is to be formed; examples thereof include a bisphenol A epoxy resin, a bisphenol F epoxy resin, a bisphenol AD epoxy resin, a bisphenol S epoxy resin, a tetrabromobisphenol A epoxy resin, a cresol novolac epoxy resin, and a phenol novolac epoxy resin.

Among these, a cresol novolac epoxy resin and phenol novolac epoxy resin having multiple epoxy groups which can serve as cross-linking points are preferably used to develop further excellent water resistance and solvent resistance.

Since the epoxy resin (a2) is encapsulated in the polyester resin (a1) particles to form the composite resin particles (A), the epoxy resin (a2) is preferably more hydrophobic than the polyester resin (a1). The term "hydrophobic" refers to the property that a substance is less likely to be soluble in water; for example, in the case where a substance is referred to as being hydrophobic, the mass of the soluble part (solubility) of the substance in water at 25° C. is preferably not more than 3 mass %, and more preferably not more than 1 mass %.

The epoxy resin (a2) that is to be used preferably has an epoxy equivalent weight of 100 to 2000 (g/eq), more preferably not more than 1000 (g/eq), and especially preferably not more than 500 (g/eq) to enhance the cross-linking density of a coating film.

The composite resin particles (A) can be produced, for example, as follows: the polyester resin (a1) is produced through the esterification of the polyol (a1-1) with the polycarboxylic acid (a1-2) in the presence or absence of a solvent, and then the polyester resin (a1), the epoxy resin (a2), the aqueous medium (B), and another material are mixed with each other.

In a specific technique for producing the polyester resin (a1), the polyester resin (a1) is produced through the esterification reaction of the polyol (a1-1) with the polycarboxylic acid (a1-2) by a known method in the absence of a solvent or in the presence of an organic solvent, and then the product is optionally mixed with a solvent or another material such as the aqueous medium (B) or an organic solvent.

In particular, the esterification reaction can be carried out by the following technique: the polyol (a1-1) and the polycarboxylic acid (a1-2) are heated preferably at 180° C. to 300° C. in an inert gas atmosphere in the presence or absence of a catalyst to induce the esterification or transesterification reaction thereof, and then the product is subjected to polycondensation under reduced pressure.

The amount of the sulfonate group-containing compound used in the production of the polyester resin (a1) is preferably in the range of 3 mass % to 30 mass % relative to the total mass of the polyol (a1-1) and the polycarboxylic acid (a1-2) to introduce the above-described specific sulfonate group into the polyester resin (a1).

The polyester resin (a1) is preferably dissolved or dispersed in the aqueous medium (B) or an organic solvent in advance in order to readily form the composite resin particles (A) in combination with the epoxy resin (a2).

Then, the polyester resin (a1) composition which has been produced as described above so as to be dissolved or dispersed in the aqueous medium (B) or an organic solvent is mixed with the epoxy resin (a2), and the product is stirred. Through such a process, the water-based composite resin composition which contains the composite resin particles (A), in which some or all parts of the epoxy resin (a2) have been encapsulated in the polyester resin (a1) particles, and which contains the aqueous medium (B) can be produced. A water-based composite resin composition which contains the composite resin particles (A) composed of the shell that is the polyester resin (a1) having a sulfonate group and the core layer that is the epoxy resin (a2) and which contains the aqueous medium (B) can be also produced through the same process.

In the case where the water-based composite resin composition produced through the above-mentioned process contains an organic solvent, the organic solvent may be removed, for example, by a distillation method in terms of a reduction in the environmental load. In this manner, the water-based composite resin composition in which the composite resin particles (A) have been dispersed in the aqueous medium (B) can be produced.

The nonvolatile content of the water-based composite resin composition is approximately in the range of preferably 10 mass % to 90 mass %, and more preferably 30 mass % to 70 mass % to maintain the coating workability and long-term storage stability.

Examples of the aqueous medium (B) used in the present invention include, water, organic solvents miscible with water, and mixtures thereof. Examples of the organic solvents miscible with water include alcohols such as methanol, ethanol, and n-propyl alcohol, and isopropyl alcohol; ketones such as acetone and methyl ethyl ketone; polyalkylene glycols such as ethylene glycol, diethylene glycol, and propylene glycol; alkyl ethers of polyalkylene glycols; and lactams such as N-methyl-2-pyrrolidone. In the present invention, merely water may be used, a mixture of water and the organic solvent miscible with water may be used, or merely the organic solvent miscible with water may be used. In view of safety and the burden on the environment, use of merely water or use of a mixture of water and the organic solvent miscible with water is preferred, and use of merely water is especially preferred.

The aqueous medium (B) content is preferably from 10 mass % to 90 mass %, and more preferably 30 mass % to 70 mass % relative to the total amount of the water-based composite resin composition.

The water-based composite resin composition of the present invention may optionally contain a variety of additives such as coalescing agents, curing agents, curing catalysts, plasticizers, antistatic agents, wax, photostabilizers, fluidity-controlling agents, dyes, leveling agents, rheology control agents, ultraviolet absorbers, antioxidants, photocatalytic compounds, inorganic pigments, organic pigments, extender pigments, polyester resins, urethane resins, acrylic resins, and other resins. In the case where such additives are water-insoluble, the additives are used when the polyester resin (a1) is dissolved or dispersed in the aqueous medium (B) or an organic solvent, which enables stable dispersion of the additives in the solvent.

Examples of usable coalescing agents include N-methyl-2-pyrrolidone, N-ethyl-2-pyrrolidone, butyl cellosolve, polypropylene glycol monomethyl ether, and butyl cellosolve. Among these, N-methyl-2-pyrrolidone and N-ethyl-2-pyrrolidone are well compatible with the water-based composite resin composition of the present invention and therefore enable production of, for example, a film or coating film which needs to be further highly transparent; hence such materials are preferably employed.

The curing agents are preferably water-soluble or water-dispersible. Specific examples of the curing agents include aliphatic amines, amines having cyclic structures, aliphatic or aromatic amines, polyamines such as polyoxyalkylene polyamine, polycarboxylic acids, and acid anhydrides.

Examples of the aliphatic amines include ethylenediamine, diethylenetriamine, triethylenetetramine, tetraethylenepentamine, pentaethylenehexamine, 2,2,4- or 2,4,4-trimethylhexamethylenediamine, bis(3-aminopropyl)methylamine, N,N'-bis(3-aminopropyl)ethylenediamine, hexamethylenediamine, 2-methyl-1,5-pentanediamine, 1,3-diaminopentane, and amino-terminated polypropylene glycols.

Examples of amines having cyclic structures (e.g., cycloalkyl ring, benzene ring, and heterocyclic ring) include piperazines such as piperazine, N-aminoethylpiperazine, and 1,4-bis(3-aminopropyl)piperazine; alicyclic polyamines such as 1,3-bis(aminomethyl)cyclohexane, isophoronediamine, 1-cyclohexylamino-3-aminopropane, 1,4-diaminocyclohexane, 2,4-diaminocyclohexane, N,N'-diethyl-1,4-diaminocyclohexane, and 3,3'-dimethyl-4,4'-diaminocyclohexylmethane; and araliphatic amines such as meta-xylylenediamine and para-xylylenediamine.

Examples of usable polycarboxylic acids include oxalic acid; malonic acid; succinic acid; glutaric acid; maleic acid; butanetetracarboxylic acid; cyclobutanetetracarboxylic acid: aconitic acid; citric acid; acid esters of polyhydric alcohols and polycarboxylic acids, the acid esters having free carboxylic acid groups; urethane resins having carboxylic acid groups; acrylic resins; and polyester resins.

In order to form a coating film having an excellent water resistance and solvent resistance, the curing agents are preferably used such that the equivalent ratio of the epoxy group of the epoxy resin (a2) to the functional group, such as an amino group or a carboxylic acid group, of the curing agents [epoxy group/functional group] is in the range of 100/80 to 100/120.

Examples of usable curing catalysts include amine-based, imidazole-based, phosphorus-based, boron-based, and phosphorus-boron-based curing catalysts. Specific examples thereof include alkylated guanidines such as ethylguanidine, trimethylguanidine, phenylguanidine, and diphenylguanidine; 3-substituted phenyl-1,1-dimethyl ureas such as 3-(3,4-dichlorophenyl)-1,1-dimethyl urea, 3-phenyl-1,1-dimethyl urea, and 3-(4-chlorophenyl)-1,1-dimethyl urea; imidazolines such as 2-methylimidazoline, 2-phenylimidazoline, 2-undecylimidazoline, and 2-heptadecylimidazoline; monoaminopyridines such as 2-aminopyridine; aminimide-based compounds such as N,N-dimethyl-N-(2-hydroxy-3-allyloxypropyl)amine-N'-lactimide; organic phosphorus-based compounds such as ethylphosphine, propylphosphine, butylphosphine, phenylphosphine, trimethylphosphine, triethylphosphine, tributylphosphine, trioctylphosiphine, triphenylphosphine, tricyclohexylphosphine, a triphenylphosphine-triphenylborane complex, and tetraphenylphosphonium tetraphenylborate; and diazabicycloundecene-based compounds such as 1,8-diazabicyclo[5,4,0]undecene-7,1,4-diazabicyclo[2,2,2]octane. These may be used alone or in combination. Among these, the imidazole-based compounds and the organic phosphorus-based compounds are preferably used.

In the present invention, for example, emulsifiers may be used to enhance the dispersion stability of the composite resin particles (A); however, emulsifiers generally tend to reduce the water resistance of a coating film.

The water-based composite resin composition of the present invention, however, has sufficient storage stability without use of emulsifiers and enables formation of a coating film, for instance, having an excellent water resistance; hence the amount of the emulsifier is preferably not more than 5 mass %, and more preferably 0 mass % relative to the total amount of the water-based composite resin composition.

The above-mentioned water-based composite resin composition of the present invention has an excellent long-term storage stability and enables formation of a coating film having an excellent water resistance and solvent resistance. Hence, the water-based composite resin composition can be used for, for example, coating agents and adhesives; in particular, the water-based composite resin composition can be suitably used as a coating agent.

Examples of substrates to which such coating agents and adhesives can be applied include metal substrates, plastic substrates, glass substrates, paper, wood substrates, and textile substrates.

Examples of usable metal substrates include plated sheet steel such as zinc coated steel sheets and aluminum-zinc alloy steel plates, aluminum plates, aluminum alloy plates, magnetic steel sheets, copper plates, stainless steel plates, and substrates having a surface that is a metallized surface.

Example of usable plastic substrates include plastic substrates generally used for plastic molded products, such as mobile phones, home electric appliances, materials used for the interior and exterior of automobiles, and OA equipment, and selected from the group consisting of polycarbonate substrates, polyester substrates, acrylonitrile-butadiene-styrene substrates, polyacrylic substrates, polystyrene substrates, polyurethane substrates, epoxy resin substrates, polyvinyl chloride substrates, and polyamide substrates.

The above-mentioned various substrates may be preliminarily coated; however, since the coating agent or another product according to the present invention has high adhesion to, for example, plastic substrates such as polyester substrates, even substrates which have not been subjected to a preliminary surface treatment such as a coating treatment can be used without problems. In other words, the coating agent according to the present invention can be suitably used as a primer for the above-mentioned plastic substrates. The substrates may be in the form of a plate, sphere, film, and sheet.

The coating agent or another product according to the present invention, for example, can be directly applied onto the surfaces of the above-mentioned substrates and then dried for curing, thereby forming coating films on the surfaces.

Examples of a technique for applying the coating agent or another product onto the above-mentioned substrates include spraying, curtain coating, flow coating, roll coating, brush painting, and dipping.

In order to carry out the drying to promote curing, the product may be cured at normal temperature over approximately 1 to 10 days; in order to quickly promote curing, the product is preferably heated at 50° C. to 250° C. for approximately 1 to 600 seconds. In the case of using plastic substrates which are easily deformed and discolored at relatively high temperature, the curing is preferably carried out at relatively low temperature of approximately 30° C. to 100° C.

The thickness of a coating film formed of the coating agent or adhesive according to the present invention can be appropriately adjusted on the basis of, for instance, applications of a substrate; in general, it is preferred that the thickness be approximately from 0.01 μm to 20 μm.

A coated product including a coating film formed of the above-mentioned coating agent has both an excellent water resistance and solvent resistance and can therefore be used for, for example, heat exchangers used in air conditioners and refrigerators; home electric appliances and displays including optical components, such as antireflection films, optical filters, optical lenses, spectacle lenses, and mirrors, which need to have an antifouling property and antifog property; materials used for the interior and exterior of automobiles; and building components such as wall materials and roofing materials.

In addition, examples of applications of a primer coating agent which is used to modify the surfaces of plastic films, such as a polyester resin, a polypropylene resin, and a polyamide resin, for formation of easy-adhesion layers include aluminum-metallized plastic films used for food packaging and highly functional films used as optical films, such as a prism lens film and an anti-glare film used for optical components included in liquid crystal displays and flat displays.

EXAMPLES

Synthesis Example 1

Preparation of Polyester Resin (I-1)

Into a reaction vessel heated to 180° C., 558 parts by mass (8.99 mol) of ethylene glycol, 478 parts by mass (4.50 mol) of diethylene glycol, 896 parts by mass (5.39 mol) of terephthalic acid, 478 parts by mass (2.88 mol) of isophthalic acid, and 0.5 parts by mass of butylhydroxy tin oxide were put, and the temperature was increased to 240° C. for 4 hours. Then, the reaction proceeded at 240° C., and approximately 260 parts by mass of distillate was trapped.

Then, the temperature was decreased to 180° C., 213 parts by mass (0.72 mol) of dimethyl 5-sodiosulfoisophthalate and 0.5 parts by mass of tetraisopropyl titanate were added to the product, and the temperature was subsequently increased to 260° C. to carry out a polycondensation reaction for an hour under reduced pressure of 2.0 mm of mercury, thereby producing a polyester resin (1-1) having a weight average molecular weight of 8,900 and a glass transition temperature of 44° C.

Synthesis Example 2

Preparation of Polyester Resin (I-2)

A polyester resin (1-2) was produced as in Synthesis Example 1 except for the following changes: 665 parts by mass (4.00 mol) of terephthalic acid replaced 896 parts by mass (5.39 mol) of terephthalic acid, 543 parts by mass (3.27 mol) of isophthalic acid replaced 478 parts by mass (2.88 mol) of isophthalic acid, and 509 parts by mass (1.72 mol) of dimethyl 5-sodiosulfoisophthalate replaced 213 parts by mass (0.72 mol) of dimethyl 5-sodiosulfoisophthalate.

Synthesis Example 3

Preparation of Polyester Resin (I-3)

A polyester resin (I-3) was produced as in Synthesis Example 1 except for the following changes: 934 parts by mass (5.62 mol) of terephthalic acid replaced 896 parts by mass (5.39 mol) of terephthalic acid, 500 parts by mass (3.01 mol) of isophthalic acid replaced 478 parts by mass (2.88 mol) of isophthalic acid, and 107 parts by mass (0.36 mol) of dimethyl 5-sodiosulfoisophthalate replaced 213 parts by mass (0.72 mol) of dimethyl 5-sodiosulfoisophthalate.

Synthesis Example 4

Preparation of Polyester Resin (I'-4)

Except that 53 parts by mass (0.25 mol) of trimellitic acid replaced the entire dimethyl 5-sodiosulfoisophthalate content, a polyester resin (I'-4) was produced through a polycondensation reaction as in Synthesis Example 1.

[Measurement of Weight Average Molecular Weight]

A weight average molecular weight was measured by gel permeation chromatography (GPC) under the following conditions.

Measurement Apparatus: High-performance GPC apparatus ("HLC-8220GPC" manufactured by TOSOH CORPORATION) Columns: The following columns manufactured by TOSOH CORPORATION were used while being connected in series
"TSKgel G5000" (7.8 mm I.D.×30 cm): one
"TSKgel G4000" (7.8 mm I.D.×30 cm): one
"TSKgel G3000" (7.8 mm I.D.×30 cm): one
"TSKgel G2000" (7.8 mm I.D.×30 cm): one
Detector: Refractive index (RI) detector
Column temperature: 40° C.
Eluent: Tetrahydrofuran
Flow rate: 1.0 mL/min
Input: 100 μL
Concentration of measurement sample: Tetrahydrofuran solution having a solid content concentration of 0.4 mass %
Standard sample: Calibration curves were defined with the following standard polystyrenes
(Standard Polystyrene)
"TSKgel standard polystyrene A—500" manufactured by TOSOH CORPORATION
"TSKgel standard polystyrene A—1000" manufactured by TOSOH CORPORATION
"TSKgel standard polystyrene A—2500" manufactured by TOSOH CORPORATION
"TSKgel standard polystyrene A—5000" manufactured by TOSOH CORPORATION
"TSKgel standard polystyrene F-1" manufactured by TOSOH CORPORATION
"TSKgel standard polystyrene F-2" manufactured by TOSOH CORPORATION
"TSKgel standard polystyrene F-4" manufactured by TOSOH CORPORATION
"TSKgel standard polystyrene F-10" manufactured by TOSOH CORPORATION
"TSKgel standard polystyrene F-20" manufactured by TOSOH CORPORATION
"TSKgel standard polystyrene F-40" manufactured by TOSOH CORPORATION
"TSKgel standard polystyrene F-80" manufactured by TOSOH CORPORATION
"TSKgel standard polystyrene F-128" manufactured by TOSOH CORPORATION
"TSKgel standard polystyrene F-288" manufactured by TOSOH CORPORATION
"TSKgel standard polystyrene F-550" manufactured by TOSOH CORPORATION

[Glass Transition Temperature]

In a temperature rise curve obtained in measurement with a differential scanning calorimeter (DSC), the intermediate value between temperatures at two bend points brought about by glass transition was obtained, and the obtained value was determined as the glass transition temperature.

TABLE 1

|  | Synthetic Example 1 | Synthetic Example 2 | Synthetic Example 3 | Synthetic Example 4 |
|---|---|---|---|---|
| Polyester resin | I-1 | I-2 | I-3 | I'-4 |
| Sulfonate group concentration (mol/kg) | 0.31 | 0.74 | 0.16 | — |
| Weight average molecular weight | 8900 | 9200 | 10100 | 11000 |

Example 1

Into a reaction vessel, 130 parts by mass of N-methyl-2-pyrrolidone was put, and 200 parts by mass of the polyester resin (I-1) was added thereto under slow stirring. The stirring was continued at 60° C. to yield a viscous polyester resin composition.

Then, 250 parts by mass of EPICLON N-673-80M (cresol novolac epoxy resin manufactured by DIC Corporation, epoxy equivalent weight of solid content: 209 g/eq, nonvolatile content: 80 mass %, solvent: methyl ethyl ketone) was added to the viscous polyester resin composition, and the product was stirred until the product was in a homogeneous state.

Then, 1000 parts by mass of ion exchanged water was added to the product for an hour, and the methyl ethyl ketone was removed at 50° C. under reduced pressure, thereby yielding a water-based composite resin composition (II-1); in the water-based composite resin composition (II-1), composite resin particles in which the polyester resin (I-1) served as the shell layer and in which the epoxy resin served as the core layer had been dispersed in the ion exchanged water, and the nonvolatile content was 35.0 mass %.

Example 2

Except that the polyester resin (I-2) was used in place of the polyester resin (I-1), a water-based composite resin composition (II-2) having a nonvolatile content of 35.0 mass % was produced as in Example 1.

Example 3

Into a reaction vessel, 130 parts by mass of N-methyl-2-pyrrolidone was put, and 200 parts by mass of the polyester resin (I-3) was added thereto under slow stirring. The stirring was continued at 60° C. to yield a viscous polyester resin composition.

Then, 250 parts by mass of EPICLON N-673-80M (cresol novolac epoxy resin manufactured by DIC Corporation, epoxy equivalent weight of solid content: 209 g/eq, nonvolatile content: 80 mass %, solvent: methyl ethyl ketone) was added to the viscous polyester resin composition, and the product was stirred until the product was in a homogeneous state.

Then, 1000 parts by mass of ion exchanged water was added to the product for an hour, and the methyl ethyl ketone was removed at 50° C. under reduced pressure, thereby yielding a water-based composite resin composition (II-3); in the water-based composite resin composition (II-3), composite resin particles in which the polyester resin (I-3) served as the shell layer and in which the epoxy resin served as the core layer had been dispersed in the ion exchanged water, and the nonvolatile content was 35.0 mass %.

Example 4

Into a reaction vessel, 200 parts by mass of N-methyl-2-pyrrolidone was put, and 200 parts by mass of the polyester resin (I-1) was added thereto under slow stirring. The stirring was continued at 60° C. to yield a viscous polyester resin composition.

Then, 583 parts by mass of EPICLON N-673-80M (cresol novolac epoxy resin manufactured by DIC Corporation, epoxy equivalent weight of solid content: 209 g/eq, nonvolatile content: 80 mass %, solvent: methyl ethyl ketone) was added to the viscous polyester resin composition, and the product was stirred until the product was in a homogeneous state.

Then, 1800 parts by mass of ion exchanged water was added to the product for an hour, and the methyl ethyl ketone was removed at 50° C. under reduced pressure, thereby yielding a water-based composite resin composition (II-4); in the water-based composite resin composition (II-4), composite resin particles in which the polyester resin (I-1) served as the shell layer and in which the epoxy resin served as the core layer had been dispersed in the ion exchanged water, and the nonvolatile content was 35.0 mass %.

Example 5

Preparation of Water-based Composite Resin Composition (II-5)

Into a reaction vessel, 160 parts by mass of N-methyl-2-pyrrolidone was put, and 240 parts by mass of the polyester resin (I-1) was added thereto under slow stirring. The stirring was continued at 60° C. to yield a viscous polyester resin composition.

Then, 75 parts by mass of EPICLON N-673-80M (cresol novolac epoxy resin manufactured by DIC Corporation, epoxy equivalent weight of solid content: 209 g/eq, nonvolatile content: 80 mass %, solvent: methyl ethyl ketone) was added to the viscous polyester resin composition, and the product was stirred until the product was in a homogeneous state.

Then, 1200 parts by mass of ion exchanged water was added to the product for an hour, and the methyl ethyl ketone was removed at 50° C. under reduced pressure, thereby yielding a water-based composite resin composition (II-5); in the water-based composite resin composition (II-5), composite resin particles in which the polyester resin (I-1) served as the shell layer and in which the epoxy resin served as the core layer had been dispersed in the ion exchanged water, and the nonvolatile content was 30.0 mass %.

Example 6

Preparation of Water-based Composite Resin Composition (II-6)

Except that EPICLON N-740-80M (phenol novolac epoxy resin manufactured by DIC Corporation, epoxy equivalent weight of solid content 180 g/eq, nonvolatile content: 80 mass %, solvent: methyl ethyl ketone) was used in place of EPICLON N-673-80M (cresol novolac epoxy resin manufactured by DIC Corporation, epoxy equivalent weight of solid content: 209 g/eq, nonvolatile content: 80 mass %, solvent: methyl ethyl ketone), a water-based composite resin composition (II-6) having a nonvolatile content of 35.0 mass % was produced as in Example 1.

Example 7

Preparation of Water-based Composite Resin Composition (II-7)

Into a reaction vessel, 130 parts by mass of N-methyl-2-pyrrolidone was put, and 200 parts by mass of the polyester resin (I-1) was added thereto under slow stirring. The stirring was continued at 60° C. to yield a viscous polyester resin composition.

Then, 200 parts by mass of EPICLON 850S (bisphenol A epoxy resin manufactured by DIC Corporation, epoxy equivalent weight of solid content: 188 g/eq, nonvolatile content: 100 mass %) was added to the viscous polyester resin composition, and the product was stirred until the product was in a homogeneous state.

Then, 613 parts by mass of ion exchanged water was added to the product for an hour, thereby yielding a water-based composite resin composition (II-7); in the water-based composite resin composition (II-7), composite resin particles in which the polyester resin (I-1) served as the shell layer and in which the epoxy resin served as the core layer had been dispersed in the ion exchanged water, and the nonvolatile content was 35.0 mass %.

Comparative Example 1

Into a reaction vessel, 130 parts by mass of N-methyl-2-pyrrolidone was put, and 200 parts by mass of the polyester resin (I'-4) was added thereto under slow stirring. The stirring was continued at 60° C. to yield a viscous polyester resin composition.

Then, 250 parts by mass of EPICLON N-673-80M (cresol novolac epoxy resin manufactured by DIC Corporation, epoxy equivalent weight of solid content: 209 g/eq, nonvolatile content: 80 mass %, solvent: methyl ethyl ketone) and 6.2 parts by mass of triethylamine were added to the viscous polyester resin composition, and the product was stirred for mixing until the product was in a homogeneous state.

Then, 1000 parts by mass of ion exchanged water was added to the product for an hour, and the methyl ethyl ketone contained in the cresol novolac epoxy resin was removed at 50° C. under reduced pressure, thereby yielding a comparative water-based composite resin composition (II'-1); in the comparative water-based composite resin composition (II'-1), composite resin particles in which the polyester resin (I'-4) served as the shell layer and in which the epoxy resin served as the core layer had been dispersed in the ion exchanged water, and the nonvolatile content was 35.0 mass %.

Comparative Example 2

Into a reaction vessel, 200 parts by mass of N-methyl-2-pyrrolidone was put, and 200 parts by mass of the polyester resin (I'-4) was added thereto under slow stirring. The stirring was continued at 60° C. to yield a viscous polyester resin composition.

Then, 583 parts by mass of EPICLON N-673-80M (cresol novolac epoxy resin manufactured by DIC Corporation, epoxy equivalent weight of solid content: 209 g/eq, nonvolatile content: 80 mass %, solvent: methyl ethyl ketone) and 6.2 parts by mass of triethylamine were added to the viscous polyester resin composition, and the product was stirred for mixing until the product was in a homogeneous state.

Then, 1800 parts by mass of ion exchanged water was added to the product for an hour, and the methyl ethyl ketone was removed at 50° C. under reduced pressure, thereby yielding a comparative water-based composite resin composition (II'-2); in the comparative water-based composite resin composition (II'-2), composite resin particles in which the polyester resin (I'-4) served as the shell layer and in which the epoxy resin served as the core layer had been dispersed in the ion exchanged water, and the nonvolatile content was 35.0 mass %.

Comparative Example 3

Into a reaction vessel, 320 parts by mass of N-methyl-2-pyrrolidone was put, and 200 parts by mass of the polyester resin (1-1) was added thereto under slow stirring. The stirring was continued at 60° C. to yield a viscous polyester resin composition.

Then, 1000 parts by mass of EPICLON N-673-80M (cresol novolac epoxy resin manufactured by DIC Corporation, epoxy equivalent weight of solid content: 209 g/eq, nonvolatile content: 80 mass %, solvent: methyl ethyl ketone) was added to the viscous polyester resin composition, and the product was stirred until the product was in a homogeneous state.

Then, 2700 parts by mass of ion exchanged water was added to the product for an hour, and the methyl ethyl ketone was removed at 50° C. under reduced pressure, thereby yielding a comparative water-based composite resin composition (II'-3); in the comparative water-based composite resin composition (II'-3), composite resin particles in which the polyester resin (I-1) served as the shell layer and in which the epoxy resin served as the core layer had been dispersed in the ion exchanged water, and the nonvolatile content was 35.0 mass %.

Comparative Example 4

Into a reaction vessel, 130 parts by mass of N-methyl-2-pyrrolidone was put, and 200 parts by mass of the polyester resin (I-1) was added thereto under slow stirring. The stirring was continued at 60° C. to yield a viscous polyester resin composition.

Then, 1000 parts by mass of ion exchanged water was added to the viscous polyester resin composition, and stirring was continued at 50° C., so that a polyester resin water dispersion was produced, in which the polyester resin (I-1) had been dissolved or dispersed in a solvent composed of the N-methyl-2-pyrrolidone and the ion exchanged water.

Then, 250 parts by mass of EPICLON N-673-80M (cresol novolac epoxy resin manufactured by DIC Corporation, epoxy equivalent weight of solid content: 209 g/eq, nonvolatile content: 80 mass %, solvent: methyl ethyl ketone) and 76.9 parts by mass of LATEMUL E-118B (sodium polyoxyethylene alkyl ether sulfate manufactured by Kao Corporation, nonvolatile content: 26 mass %) were put into another reaction vessel and homogeneously mixed. Then, 600 parts by mass of ion exchanged water was added to the mixture for an hour to yield a cresol novolac epoxy resin water dispersion.

The polyester resin water dispersion and the cresol novolac epoxy resin water dispersion were mixed, and the methyl ethyl ketone was removed at 50° C. under reduced pressure, thereby producing a comparative water-based composite resin composition (II'-4); in the comparative water-based composite resin composition (II'-4); the polyester resin particles and the cresol novolac epoxy resin particles had been independently dispersed in the ion exchanged water, and the nonvolatile content was 35.0 mass %.

Comparative Example 5

Into a reaction vessel, 196 parts by mass of N-methyl-2-pyrrolidone was put, and 294 parts by mass of the polyester resin (I-1) was added thereto under slow stirring. The stirring was continued at 60° C. to yield a viscous polyester resin composition.

Then, 7.5 parts by mass of EPICLON N-673-80M (cresol novolac epoxy resin manufactured by DIC Corporation, epoxy equivalent weight of solid content: 209 g/eq, nonvolatile content: 80 masse, solvent: methyl ethyl ketone) was added to the viscous polyester resin composition, and the product was stirred until the product was in a homogeneous state.

Then, 1400 parts by mass of ion exchanged water was added to the product for an hour, and the methyl ethyl ketone was removed at 50° C. under reduced pressure, thereby yielding a comparative water-based composite resin composition (II'-5); in the comparative water-based composite resin composition (II'-5), composite resin particles in which the polyester resin (I-1) served as the shell layer and in which the epoxy resin served as the core layer had been dispersed in the ion exchanged water, and the nonvolatile content was 20.0 mass %.

[Evaluation Method of Storage Stability 1]

The water-based composite resin compositions produced in Examples and the comparative water-based composite resin compositions produced in Comparative Examples were stored at 40° C. for 30 days immediately after the production thereof.

The appearance of each water-based composite resin composition stored for 30 days was visually observed and evaluated on the basis of the following criteria.

Excellent: No aggregate was observed, and no change was found as compared with the state immediately after the production Good: Some precipitate was observed but practically negligible; the precipitate was able to be redispersed by being stirred again Unacceptable: Precipitate was observed to a considerable extent and was not able to be sufficiently redispersed even by being stirred again; some portion of the precipitate remained Bad: Precipitated part of the total resin content was approximately not less than 50 mass %, and the precipitate was not able to be redispersed even by being stirred again

TABLE 2

| | Example 1 | Example 2 | Example 3 | Example 4 |
|---|---|---|---|---|
| Water-based composite resin composition | II-1 | II-2 | II-3 | II-4 |
| Polyester resin (I-1) Mass percentage of solid content | 50 | — | — | 30 |
| Polyester resin (I-2) | — | 50 | — | — |
| Polyester resin (I-3) | — | — | 50 | — |
| EPICLON N-673-80M | 50 | 50 | 50 | 70 |
| EPICLON N-740-80M | — | — | — | — |
| Nonvolatile content (mass %) | 35.0 | 35.0 | 35.0 | 35.0 |
| Storage stability 1 | Excellent | Excellent | Good | Excellent |

TABLE 3

|  |  | Example 5 | Example 6 | Example 7 |
|---|---|---|---|---|
| Water-based composite resin composition | | II-5 | II-6 | II-7 |
| Polyester resin (I-1) | Mass percentage of solid content | 80 | 50 | 50 |
| Polyester resin (I-2) | | — | — | — |
| Polyester resin (I-3) | | — | — | — |
| EPICLON N-673-80M | | 20 | — | — |
| EPICLON N-740-80M | | — | 50 | — |
| EPICLON 850S | | — | — | 50 |
| Nonvolatile content (mass %) | | 30.0 | 35.0 | 35.0 |
| Storage stability 1 | | Excellent | Excellent | Good |

TABLE 4

|  |  | Comparative Example 1 | Comparative Example 2 | Comparative Example 3 | Comparative Example 4 | Comparative Example 5 |
|---|---|---|---|---|---|---|
| Water-based composite resin composition | Mass percentage of solid content | II'-1 | II'-2 | II'-3 | II'-4 | II'-5 |
| Polyester resin (I-1) | | — | — | 20 | 50 | 98 |
| Polyester resin (I'-4) | | 50 | 30 | — | — | — |
| EPICLON N-673-80M | | 50 | 70 | 80 | 50 | 2 |
| Nonvolatile content (mass %) | | 35.0 | 35.0 | 35.0 | 35.0 | 20.0 |
| Storage stability 1 | | Bad | Bad | Unacceptable | Good | Excellent |

In Tables 2 to 4, "EPICLON N-673-80M" is a cresol novolac epoxy resin manufactured by DIC Corporation.

"EPICLON N-740-80M" is a phenol novolac epoxy resin manufactured by DIC Corporation. "EPICLON 850S" is a bisphenol A epoxy resin manufactured by DIC Corporation.

Example 8

In order to produce a water-based composite resin composition (III-1), 285.7 parts by mass of the water-based composite resin composition (II-1) immediately after being produced in Example 1 was mixed with 153.2 parts by mass of an aqueous solution of 10 mass % of citric acid.

Then, this water-based composite resin composition (III-1) was applied onto a surface of an untreated PET film (Lumirror) manufactured by Toray Industries, Inc. with a bar coater so as to have a dried film thickness of 5 μm, and the product was subsequently dried at 150° C. for 5 minutes to form a coating film.

Furthermore, another coating film was formed in the same manner except that a water-based composite resin composition that was the water-based composite resin composition (II-1) subjected to the test of Storage Stability 1 was used in place of the water-based composite resin composition (II-1) immediately after being produced in Example 1.

Example 9

Except that 8.5 parts by mass of 1,3-bis(aminomethyl)cyclohexane was used in place of 153.2 parts by mass of an aqueous solution of 10 mass % of citric acid, a water-based composite resin composition (III-1-1) and a coating film thereof were produced as in Example 8.

Furthermore, another coating film was formed in the same manner except that a water-based composite resin composition that was the water-based composite resin composition (II-1) subjected to the test of Storage Stability 1 was used in place of the water-based composite resin composition (II-1) immediately after being produced in Example 1.

Example 10

Except that 285.7 parts by mass of the water-based composite resin composition (II-2) immediately after being produced in Example 2 was used in place of 285.7 parts by mass of the water-based composite resin composition (II-1), a water-based composite resin composition (III-2) and a coating film thereof were produced as in Example 8.

Furthermore, another coating film was formed in the same manner except that a water-based composite resin composition that was the water-based composite resin composition (II-2) subjected to the test of Storage Stability 1 was used in place of the water-based composite resin composition (II-2) immediately after being produced in Example 1.

Example 11

Except that 285.7 parts by mass of the water-based composite resin composition (II-3) immediately after being produced in Example 3 was used in place of 285.7 parts by mass of the water-based composite resin composition (II-1), a water-based composite resin composition (III-3) and a coating film thereof were produced as in Example 8.

Furthermore, another coating film was formed in the same manner except that a water-based composite resin composition that was the water-based composite resin composition (II-3) subjected to the test of Storage Stability 1 was used in place of the water-based composite resin composition (II-3) immediately after being produced in Example 3.

Example 12

Except that 285.7 parts by mass of the water-based composite resin composition (II-4) immediately after being produced in Example 4 was used in place of 285.7 parts by mass of the water-based composite resin composition (II-1) and that 199.2 parts by mass of an aqueous solution of 10 mass % of citric acid was used in place of 153.2 parts by mass of the aqueous solution of 10 mass % of citric acid, a water-based composite resin composition (III-4) and a coating film thereof were produced as in Example 8.

Furthermore, another coating film was formed in the same manner except that a water-based composite resin composition that was the water-based composite resin composition (II-4) subjected to the test of Storage Stability 1 was used in place of the water-based composite resin composition (II-4) immediately after being produced in Example 4.

Example 13

Except that 333.3 parts by mass of the water-based composite resin composition (II-5) immediately after being produced in Example 5 was used in place of 285.7 parts by mass of the water-based composite resin composition (II-1) and that 61.3 parts by mass of an aqueous solution of 10 mass % of citric acid was used in place of 153.2 parts by mass of the aqueous solution of 10 mass % of citric acid, a water-based composite resin composition (III-5) and a coating film thereof were produced as in Example 8.

Furthermore, another coating film was formed in the same manner except that a water-based composite resin composition that was the water-based composite resin composition (II-5) subjected to the test of Storage Stability 1 was used in place of the water-based composite resin composition (II-5) immediately after being produced in Example 5.

Example 14

Except that 285.7 parts by mass of the water-based composite resin composition (II-6) immediately after being produced in Example 6 was used in place of 285.7 parts by mass of the water-based composite resin composition (II-1) and that 177.9 parts by mass of an aqueous solution of 10 mass % of citric acid was used in place of 153.2 parts by mass of the aqueous solution of 10 mass % of citric acid, a water-based composite resin composition (III-6) and a coating film thereof were produced as in Example 8.

Furthermore, another coating film was formed in the same manner except that a water-based composite resin composition that was the water-based composite resin composition (II-6) subjected to the test of Storage Stability 1 was used in place of the water-based composite resin composition (II-6) immediately after being produced in Example 6.

Example 15

Except that 285.7 parts by mass of the water-based composite resin composition (II-7) immediately after being produced in Example 7 was used in place of 285.7 parts by mass of the water-based composite resin composition (II-1) and that 170.3 parts by mass of an aqueous solution of 10 mass % of citric acid was used in place of 153.2 parts by mass of the aqueous solution of 10 mass % of citric acid, a water-based composite resin composition (III-7) and a coating film thereof were produced as in Example 8.

Furthermore, another coating film was formed in the same manner except that a water-based composite resin composition that was the water-based composite resin composition (II-7) subjected to the test of Storage Stability 1 was used in place of the water-based composite resin composition (II-7) immediately after being produced in Example 7.

Comparative Example 6

Except that 285.7 parts by mass of the comparative water-based composite resin composition (II'-1) immediately after being produced in Comparative Example 1 was used in place of 285.7 parts by mass of the water-based composite resin composition (II-1), a comparative water-based composite resin composition (III'-1) and a coating film thereof were produced as in Example 8.

Furthermore, another coating film was formed in the same manner except that a water-based composite resin composition that was the water-based composite resin composition (II'-1) subjected to the test of Storage Stability 1 was used in place of the water-based composite resin composition (II'-1) immediately after being produced in Comparative Example 1.

Comparative Example 7

Except that 285.7 parts by mass of the comparative water-based composite resin composition (II'-2) immediately after being produced in Comparative Example 2 was used in place of 285.7 parts by mass of the water-based composite resin composition (II-1) and that 214.5 parts by mass of an aqueous solution of 10 mass % of citric acid was used in place of 153.2 parts by mass of the aqueous solution of 10 mass % of citric acid, a comparative water-based composite resin composition (III'-2) and a coating film thereof were produced as in Example 8.

Furthermore, another coating film was formed in the same manner except that a water-based composite resin composition that was the water-based composite resin composition (II'-2) subjected to the test of Storage Stability 1 was used in place of the water-based composite resin composition (II'-2) immediately after being produced in Comparative Example 2.

Comparative Example 8

Except that 285.7 parts by mass of the comparative water-based composite resin composition (II'-3) immediately after being produced in Comparative Example 3 was used in place of 285.7 parts by mass of the water-based composite resin composition (II-1) and that 245.1 parts by mass of an aqueous solution of 10 mass % of citric acid was used in place of 153.2 parts by mass of the aqueous solution of 10 mass % of citric acid, a comparative water-based composite resin composition (III'-3) and a coating film thereof were produced as in Example 8.

Furthermore, another coating film was formed in the same manner except that a water-based composite resin composition that was the water-based composite resin composition (II'-3) subjected to the test of Storage Stability 1 was used in place of the water-based composite resin composition (II'-3) immediately after being produced in Comparative Example 3.

Comparative Example 9

Except that 285.7 parts by mass of the comparative water-based composite resin composition (II'-4) immediately after being produced in Comparative Example 4 was used in place of 285.7 parts by mass of the water-based composite resin composition (II-1), a comparative water-based composite resin composition (III'-4) and a coating film thereof were produced as in Example 8.

Furthermore, another coating film was formed in the same manner except that a water-based composite resin composition that was the water-based composite resin composition (II'-4) subjected to the test of Storage Stability 1 was used in place of the water-based composite resin composition (II'-4) immediately after being produced in Comparative Example 4.

Comparative Example 10

Except that 571.4 parts by mass of the comparative water-based composite resin composition (II'-5) immediately after being produced in Comparative Example 5 was used in place of 285.7 parts by mass of the water-based composite resin composition (II-1) and that 7.0 parts by mass of an aqueous solution of 10 mass % of citric acid was used in place of 153.2 parts by mass of the aqueous solution of 10 mass % of citric acid, a comparative water-based composite resin composition and a coating film thereof were produced as in Example 8.

Furthermore, another coating film was formed in the same manner except that a water-based composite resin composition that was the water-based composite resin composition (II'-5) subjected to the test of Storage Stability 1 was used in place of the water-based composite resin composition (II'-5) immediately after being produced in Comparative Example 5.

[Evaluation Method of Solvent Resistance 1 (Solvent Resistance of Coating Film Formed of Water-Based Composite Resin Composition Immediately after Production Thereof)]

The surface of each coating film formed as described above was rubbed 30 times with a swab containing 100 mass % of ethanol at a pressure of approximately 0.3 kg. The rubbed surface of the coating film was visually observed and evaluated on the basis of the following criteria.

Excellent: No change was found in the surface of a coating film after the rubbing Good: Slightly whitened or damaged part was observed on the surface of a coating film after the rubbing while the coating film still had sufficient transparency, but practically negligible Unacceptable: Clearly whitened or damaged part was observed on the surface of a coating film after the rubbing, and the transparency was clearly reduced Bad: The surface of a coating film was dissolved, and the surface of the untreated PET film (Lumirror) was exposed In Tables, a mark "-" is put for the case in which a water-based composite resin composition, for instance, coagulated or solidified and thus was unsuitable for being applied onto the film for the formation of a coating film.

[Evaluation Method of Solvent Resistance 2 (Solvent Resistance of Coating Film Formed of Water-Based Composite Resin Composition Immediately after Production Thereof)]

The nibs of black, red, and blue marker pens according to JIS S 6037 were pressed against the surface of each coating film formed as described above, and the marker pens were moved in a direction perpendicular to the longer side of the nibs at a rate of approximately 150 mm/sec to draw a set of three lines having a width of approximately 2 cm and adjoining each other on the surface of the coating film, thereby entirely painting an area of approximately 36 cm$^2$ of the surface of the coating film.

The painted coating film was left to stand at normal temperature for 18 hours, and its surface was wiped with clear gauze containing a mixed solvent composed of petroleum benzine and ethanol at a mass ratio of 1:1 to remove the inks of the marker pens applied onto the surface of the coating film. Then, such a surface of the coating film was lightly wiped with clean dry gauze, and the coating film was further left to stand at room temperature for an hour.

The surface of the coating film after being left to stand was visually observed under scattering daylight and then compared with the coating film before this test to visually evaluate changes in the color and gloss of the coating film and the presence or absence of swelling thereof.

Excellent: No changes in the color and gloss were observed, such as discoloration and a reduction in gloss Good: Slight changes in the color and gloss were observed but practically negligible Unacceptable: Changes in the color and gloss were observed in approximately half the area of 4 cm$^2$ of a coating film Bad: Highly significant changes in the color and gloss were observed and practically problematic In Tables, a mark "-" is put for the case in which a water-based composite resin composition, for instance, coagulated or solidified and thus was unsuitable for being applied onto the film for the formation of a coating film.

[Evaluation Method of Solvent Resistance 3 (Solvent Resistance of Coating Film Formed of Water-Based Composite Resin Composition after Test of Storage Stability 1]

The surface of the coating film formed of each water-based composite resin composition subjected to the test of Storage Stability 1 (40° C. for 30 days) was rubbed 30 times with a swab containing 100 mass % of ethanol at a pressure of approximately 0.3 kg. The rubbed surface of the coating film was visually observed and evaluated on the basis of the following criteria.

Excellent: No change was found in the surface of a coating film after the rubbing Good: Slightly whitened or damaged part was observed on the surface of a coating film after the rubbing while the coating film still had sufficient transparency, but practically negligible Unacceptable: Clearly whitened or damaged part was observed on the surface of a coating film after the rubbing, and the transparency was clearly reduced Bad: The surface of a coating film was dissolved, and the surface of the untreated PET film (Lumirror) was exposed In Tables, a mark "-" is put for the case in which a water-based composite resin composition, for instance, coagulated or solidified and thus was unsuitable for being applied onto the film for the formation of a coating film.

[Evaluation Method of Solvent Resistance 4 (Solvent Resistance of Coating Film Formed of Water-Based Composite Resin Composition after Test of Storage Stability 1]

The nibs of black, red, and blue marker pens according to JIS S 6037 were pressed against the surface of each of the coating films formed of the water-based composite resin compositions subjected to the test of Storage Stability 1 (40° C. for 30 days), and the marker pens were moved in a direction perpendicular to the longer side of the nibs at a rate of approximately 150 mm/sec to draw a set of three lines having a width of approximately 2 cm and adjoining each other on the surface of the coating film, thereby entirely painting an area of approximately 36 cm$^2$ of the surface of the coating film.

The painted coating film was left to stand at normal temperature for 18 hours, and its surface was wiped with clear gauze containing a mixed solvent composed of petroleum benzine and ethanol at a mass ratio of 1:1 to remove the inks of the marker pens applied onto the surface of the coating film. Then, such a surface of the coating film was lightly wiped with clean dry gauze, and the coating film was further left to stand at room temperature for an hour.

The surface of the coating film after being left to stand was visually observed under scattering daylight and then compared with the coating film before this test to visually evaluate changes in the color and gloss of the coating film and the presence or absence of swelling thereof.

Excellent: No changes in the color and gloss were observed, such as discoloration and a reduction in gloss Good: Slight changes in the color and gloss were observed but practically negligible Unacceptable: Changes in the color and gloss were observed in approximately half the area of 4 cm² of a coating film Bad: Highly significant changes in the color and gloss were observed and practically problematic In Tables, a mark "-" is put for the case in which a water-based composite resin composition, for instance, coagulated or solidified and thus was unsuitable for being applied onto the film for the formation of a coating film.

[Evaluation Method of Water Resistance 1 (Water Resistance of Coating Film Formed of Water-Based Composite Resin Composition Immediately after Production Thereof)

The coating films formed in Examples and Comparative Examples were immersed in water at 40° C. for 24 hours, and then the surface of each coating film was visually observed and evaluated on the basis of the following criteria.

Excellent: No change was found in the surface of a coating film after the immersion Good: Slightly whitened or damaged part was observed on the surface of a coating film after the immersion while the coating film still had sufficient transparency, but practically negligible Unacceptable: Clearly whitened or damaged part was observed on the surface of a coating film after the immersion, and the transparency was clearly reduced Bad: Clearly whitened or damaged part was observed on the surface of a coating film after the immersion, and the transparency was significantly reduced

[Evaluation Method of Water Resistance 2 (Water Resistance of Coating Film Formed of Water-Based Composite Resin Composition Immediately after Production Thereof)

The coating films formed in Examples and Comparative Examples were immersed in water at 40° C. for 30 days, and then the surface of each coating film was visually observed and evaluated on the basis of the same criteria as used for the evaluation of Water Resistance 1.

[Evaluation Method of Water Resistance 3 (Water Resistance of Coating Film Formed of Water-Based Composite Resin Composition Immediately after Production Thereof)

The coating films formed in Examples and Comparative Examples were immersed in water at 60° C. for 30 days, and then the surface of each coating film was visually observed and evaluated on the basis of the same criteria as used for the evaluation of Water Resistance 1.

[Evaluation Method of Water Resistance 4 (Water Resistance of Coating Film Formed of Water-Based Composite Resin Composition after Test of Storage Stability 1]

The coating films formed of the water-based composite resin compositions subjected to the test of Storage Stability 1 (40° C. for 30 days) were immersed in water at 40° C. for 24 hours. Then, the surface of each coating film was visually observed and evaluated on the basis of the following criteria.

Excellent: No change was found in the surface of a coating film after the immersion Good: Slightly whitened or damaged part was observed on the surface of a coating film after the immersion while the coating film still had sufficient transparency, but practically negligible Unacceptable: Clearly whitened or damaged part was observed on the surface of a coating film after the immersion, and the transparency was clearly reduced Bad: Clearly whitened or damaged part was observed on the surface of a coating film after the immersion, and the transparency was significantly reduced In Tables, a mark "-" is put for the case in which a water-based composite resin composition, for instance, coagulated or solidified and thus was unsuitable for being applied onto the film for the formation of a coating film.

[Evaluation Method of Water Resistance 5 (Water Resistance of Coating Film Formed of Water-Based Composite Resin Composition after Test of Storage Stability 1]

The coating films formed of the water-based composite resin compositions subjected to the test of Storage Stability 1 were immersed in water at 40° C. for 30 days. Then, the surface of each coating film was visually observed and evaluated on the basis of the same criteria as used for the evaluation of Water Resistance 4.

[Evaluation Method of Water Resistance 6 (Water Resistance of Coating Film Formed of Water-Based Composite Resin Composition after Test of Storage Stability 1]

The coating films formed of the water-based composite resin compositions subjected to the test of Storage Stability 1 were immersed in water at 60° C. for 30 days. Then, the surface of each coating film was visually observed and evaluated on the basis of the same criteria as used for the evaluation of Water Resistance 4.

TABLE 5

|  |  | Example 8 | Example 9 | Example 10 | Example 11 |
|---|---|---|---|---|---|
| Water-based composite resin composition (II-1) | Parts by mass | 285.7 | 285.7 | — | — |
| Water-based composite resin composition (II-2) |  | — | — | 285.7 | — |
| Water-based composite resin composition (II-3) |  | — | — | — | 285.7 |
| Water-based composite resin composition (II-4) |  | — | — | — | — |
| Water-based composite resin composition (II-5) |  | — | — | — | — |
| Water-based composite resin composition (II-6) |  | — | — | — | — |
| Aqueous solution of 10 mass % citric acid |  | 153.2 | — | 153.2 | 153.2 |
| 1,3-bis(aminomethyl)hexane |  | — | 8.5 | — | — |
| Mass ratio [polyester resin/ epoxy resin] |  | 50/50 | 50/50 | 50/50 | 50/50 |
| Solvent Resistance 1 |  | Excellent | Excellent | Excellent | Good |

TABLE 5-continued

|  | Example 8 | Example 9 | Example 10 | Example 11 |
|---|---|---|---|---|
| Solvent Resistance 2 | Good | Good | Good | Good |
| Solvent Resistance 3 | Excellent | Good | Excellent | Good |
| Solvent Resistance 4 | Good | Good | Good | Good |
| Water Resistance 1 | Excellent | Good | Good | Excellent |
| Water Resistance 2 | Excellent | Good | Good | Excellent |
| Water Resistance 3 | Excellent | Good | Good | Excellent |
| Water Resistance 4 | Good | Good | Good | Good |
| Water Resistance 5 | Good | Good | Good | Good |
| Water Resistance 6 | Good | Good | Good | Good |

TABLE 6

|  |  | Example 12 | Example 13 | Example 14 | Example 15 |
|---|---|---|---|---|---|
| Water-based composite resin composition (II-1) | Parts by mass | — | — | — | — |
| Water-based composite resin composition (II-2) |  | — | — | — | — |
| Water-based composite resin composition (II-3) |  | — | — | — | — |
| Water-based composite resin composition (II-4) |  | 285.7 | — | — | — |
| Water-based composite resin composition (II-5) |  | — | 333.3 | — | — |
| Water-based composite resin composition (II-6) |  | — | — | 285.7 | — |
| Water-based composite resin composition (II-7) |  | — | — | — | 285.7 |
| Aqueous solution of 10 mass % citric acid |  | 199.2 | 61.3 | 177.9 | 170.3 |
| 1,3-bis(aminomethyl)hexane |  | — | — | — | — |
| Mass ratio [polyester resin/epoxy resin] |  | 35/65 | 80/20 | 50/50 | 50/50 |
| Solvent Resistance 1 |  | Excellent | Good | Excellent | Good |
| Solvent Resistance 2 |  | Good | Good | Good | Good |
| Solvent Resistance 3 |  | Excellent | Good | Excellent | Good |
| Solvent Resistance 4 |  | Good | Good | Good | Good |
| Water Resistance 1 |  | Excellent | Good | Excellent | Good |
| Water Resistance 2 |  | Excellent | Good | Excellent | Good |
| Water Resistance 3 |  | Excellent | Good | Excellent | Good |
| Water Resistance 4 |  | Excellent | Good | Good | Good |
| Water Resistance 5 |  | Excellent | Good | Good | Good |
| Water Resistance 6 |  | Excellent | Good | Good | Good |

TABLE 7

|  |  | Comparative Example 6 | Comparative Example 7 | Comparative Example 8 | Comparative Example 9 | Comparative Example 10 |
|---|---|---|---|---|---|---|
| Comparative water-based composite resin composition (II'-1) | Parts by mass | 285.7 | — | — | — | — |
| Comparative water-based composite resin composition (II'-2) |  | — | 285.7 | — | — | — |
| Comparative water-based composite resin composition (II'-3) |  | — | — | 285.7 | — | — |
| Comparative water-based composite resin composition (II'-4) |  | — | — | — | 285.7 | — |
| Comparative water-based composite resin composition (II'-5) |  |  |  |  |  | 571.4 |

TABLE 7-continued

|  | Comparative Example 6 | Comparative Example 7 | Comparative Example 8 | Comparative Example 9 | Comparative Example 10 |
|---|---|---|---|---|---|
| Aqueous solution of 10 mass % citric acid | 153.2 | 214.5 | 245.1 | 153.2 | 7.0 |
| Mass ratio [polyester resin/epoxy resin] | 50/50 | 30/70 | 20/80 | 50/50 | 98/2 |
| Solvent Resistance 1 | Excellent | Excellent | Good | Unacceptable | Bad |
| Solvent Resistance 2 | Good | Good | Good | Bad | Bad |
| Solvent Resistance 3 | — | — | Unacceptable | Unacceptable | Bad |
| Solvent Resistance 4 | — | — | Unacceptable | Bad | Bad |
| Water Resistance 1 | Excellent | Excellent | Excellent | Bad | Bad |
| Water Resistance 2 | Excellent | Excellent | Excellent | Bad | Bad |
| Water Resistance 3 | Excellent | Excellent | Excellent | Bad | Bad |
| Water Resistance 4 | — | — | Unacceptable | Bad | Bad |
| Water Resistance 5 | — | — | Unacceptable | Bad | Bad |
| Water Resistance 6 | — | — | Unacceptable | Bad | Bad |

The water-based composite resin compositions of Examples 8 and 9 in which different curing agents had been used each enabled formation of a coating film having an excellent solvent resistance and water resistance. In particular, the water-based composite resin composition of Example 8 had high quality in terms of water resistance.

The water-based composite resin composition of Example 10 having a high sulfonate group content and the water-based composite resin composition of Example 11 having a low sulfonate group content each also enabled formation of a coating film having an excellent solvent resistance and water resistance. In particular, the water-based composite resin composition of Example 11 had high quality in terms of water resistance. The water-based composite resin composition of Example 12 in which the mass ratio of the polyester resin (a1) to the epoxy resin (a2) was 30/70 had especially high quality in terms of solvent resistance.

The water-based composite resin composition of Example 13 in which such a mass ratio was 80/20 enabled formation of a coating film having a good solvent resistance and water resistance.

The water-based composite resin composition of Example 14 in which the phenol novolac epoxy resin had been used as an epoxy resin had high quality in terms of solvent resistance and water resistance.

The water-based composite resin composition of Example 15 in which the bisphenol A epoxy resin had been used as an epoxy resin enabled formation of a coating film having a good solvent resistance and water resistance.

In contrast, the water-based composite resin compositions of Comparative Examples 6 and 7 which contained a carboxyl group instead of a sulfonate group had insufficient quality in terms of storage stability; in addition, coating films were not successfully formed of the water-based composite resin compositions stored under specific conditions.

The water-based composite resin composition of Comparative Example 8 in which the mass ratio of the polyester resin (a1) to the epoxy resin (a2) was 20/80 had insufficient quality in terms of storage stability; in addition, a coating film formed of the water-based composite resin composition stored under specific conditions had an insufficient solvent resistance and water resistance.

The water-based composite resin composition of Comparative Example 9 in which the polyester resin and the epoxy resin had been independently dispersed in the aqueous medium did not enable formation of a coating film having an excellent solvent resistance and water resistance.

The water-based composite resin composition of Comparative Example 10 having the excessive polyester resin (a1) content did not enable formation of a coating film having an excellent solvent resistance and water resistance.

The invention claimed is:

1. A water-based composite resin composition comprising:
   composite resin particles (A);
   a curing agent including any one of an amine having a cyclic structure and a polycarboxylic acid; and
   an aqueous medium (B),
   wherein:
   the composite resin particles (A) contain polyester resin (a1) particles having a sulfonate group, and an epoxy resin (a2), of which some or all parts are encapsulated in the polyester resin (a1) particles;
   the sulfonate group content is in the range of 0.2 mol/kg to 0.6 mol/kg relative to the total amount of the polyester resin (a1);
   the mass ratio (a1)/(a2) of the polyester resin (a1) to the epoxy resin (a2) in the composite resin particles (A) is in the range of 95/5 to 30/70; and
   the polyester resin (a1) particles are produced through a reaction of a polyol (a1-1) with an aromatic polycarboxylic acid (a1-2-1), including any one of 5-sodium sulfoisophthalic acid and an esterification product thereof.

2. The water-based composite resin composition according to claim 1, wherein the composite resin particles (A) each include a shell that is the polyester resin (a1) having a sulfonate group and a core layer that is the epoxy resin (a2).

3. An article comprising a layer (I) formed of a polyester substrate, a primer coating layer (II) formed of the water-based composite resin composition according to claim 2, and an overcoat layer (III).

4. The water-based composite resin composition according to claim 1, wherein the epoxy resin (a2) is a novolac epoxy resin.

5. An article comprising a layer (I) formed of a polyester substrate, a primer coating layer (II) formed of the water-based composite resin composition according to claim 4, and an overcoat layer (III).

6. An article comprising a layer (I) formed of a polyester substrate, a primer coating layer (II) formed of the water-based composite resin composition according to claim 1, and an overcoat layer (III).

7. The water-based composite resin composition according to claim 1, wherein the curing agent contains any one of an amine having a cycloalkyl ring structure and a polycarboxylic acid including citric acid.

8. An article comprising a layer (I) formed of a polyester substrate, a primer coating layer (II) formed of the water-based composite resin composition according to claim 7, and an overcoat layer (III).

* * * * *